UNITED STATES PATENT OFFICE.

GEORGE AUSTIN MARSH, OF LITTLETON, MASSACHUSETTS.

BAKING-POWDER.

SPECIFICATION forming part of Letters Patent No. 328,419, dated October 13, 1885.

Application filed March 16, 1885. Serial No. 159,075. (No specimens.)

*To all whom it may concern:*

Be it known that I, GEORGE A. MARSH, of Littleton, in the county of Middlesex and State of Massachusetts, have invented certain Improvements in Baking-Powders, of which the following is a specification.

This invention has for its object to provide a method of preventing the change and reaction which takes place when acid calcium lactate is mixed with bicarbonate of soda to form a baking-powder. The reaction causes the active properties of the baking-powder to be given off in the form of a gas, which, escaping, makes the mixture useless. It has therefore been necessary heretofore to put up the said ingredients in separate packages and mix them when they are about to be used.

My invention consists in protecting the mixture from reaction and change by means of an oleaginous material and starch or starchy matter, applied as I will now proceed to describe.

In carrying out my invention I take thirteen parts, by weight, of dried acid calcium lactate and mix with it about five per cent. of its weight of lard, tallow, or other suitable oleaginous material, lard being preferred because it does not require to be warmed or softened, and because it can be obtained in a perfectly odorless condition. I prefer to mix said materials by repeatedly passing them together through a fine sieve. To this mixture I next add about twenty per cent. of the weight of the acid calcium lactate of dry powdered starch or starchy matter—such as flour. The starch with the oleaginous material forms a protective water-proof coating around the particles of acid calcium lactate. I then take five parts, by weight, of bicarbonate of soda and preferably treat it with oleaginous material and starch in the manner already described, using of starch about twenty per cent. of the weight of bicarbonate of soda, and add it to the mixture already obtained; or, if preferred, the bicarbonate of soda and starch may be added without being treated with oleaginous material, in which case a larger proportion of the latter should be mixed with the acid calcium lactate.

Any other suitable alkaline carbonate or bicarbonate may be used instead of bicarbonate of soda, the relative proportions of such alkaline carbonates or bicarbonates varying according to their chemical formula.

The mixture is now ready for use, and may be packed in tin boxes. The addition of the oleaginous material prevents any reaction or change, and enables the mixture to be kept indefinitely. I thus avoid the inconvenience of putting up the parts of the baking-powder in separate packages, and prevent mistakes which frequently occur in properly proportioning said parts when they are mixed by cooks.

I do not limit myself to the exact proportions above specified, but may vary the same without departing from the spirit of my invention.

I am aware that a baking-powder composed of an acid lactate and alkaline carbonate or bicarbonate is not new, the same being claimed in Letters Patent No. 235,615, granted to C. E. Avery, December 21, 1880. The present invention is therefore an improvement on that set forth by said patent.

I claim—

1. An acid lactate baking-powder in which the separate salts are protected from reaction during storage by the presence of an oleaginous or fatty material, as set forth.

2. A baking-powder composed of acid calcium lactate and an alkaline carbonate or bicarbonate, one or both previously treated with an oleaginous material, and starch or starchy matter, as set forth.

In testimony whereof I have signed my name to this specification, in the presence of two subscribing witnesses, this 2d day of March, 1885.

GEORGE AUSTIN MARSH.

Witnesses:
C. F. BROWN,
A. L. WHITE.